United States Patent
Madinger et al.

(10) Patent No.: US 11,433,615 B2
(45) Date of Patent: Sep. 6, 2022

(54) FIXTURE AND METHOD OF CLEANING ADDITIVE MANUFACTURING MACHINE COMPONENTS

(71) Applicant: Hamilton Sundstrand Corporation, Charlotte, NC (US)

(72) Inventors: Alexander Madinger, Hartford, CT (US); Diana Giulietti, Weatogue, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/095,011

(22) Filed: Nov. 11, 2020

(65) Prior Publication Data

US 2021/0069982 A1  Mar. 11, 2021

Related U.S. Application Data

(62) Division of application No. 15/969,440, filed on May 2, 2018, now Pat. No. 10,870,238.

(51) Int. Cl.
| | |
|---|---|
| *B29C 64/35* | (2017.01) |
| *B29C 64/218* | (2017.01) |
| *B33Y 30/00* | (2015.01) |
| *B33Y 40/00* | (2020.01) |
| *B29C 64/153* | (2017.01) |
| *B33Y 10/00* | (2015.01) |

(52) U.S. Cl.
CPC ............ *B29C 64/35* (2017.08); *B29C 64/153* (2017.08); *B29C 64/218* (2017.08); *B33Y 10/00* (2014.12); *B33Y 30/00* (2014.12); *B33Y 40/00* (2014.12)

(58) Field of Classification Search
CPC ..... B29C 64/35; B29C 64/218; B29C 64/153; B33Y 30/00; B33Y 40/00
See application file for complete search history.

(56) References Cited

U.S. PATENT DOCUMENTS

| | | |
|---|---|---|
| 7,785,093 B2 | 8/2010 | Holmboe et al. |
| 2003/0089384 A1 | 5/2003 | Sato et al. |
| 2016/0067929 A1 | 3/2016 | Park |
| 2016/0368054 A1 | 12/2016 | Ng et al. |
| 2018/0043615 A1 | 2/2018 | Hochsmann et al. |
| 2019/0160537 A1 | 5/2019 | Hofmann |
| 2019/0337229 A1 | 11/2019 | Madinger et al. |
| 2020/0055247 A1 | 2/2020 | Geay et al. |

FOREIGN PATENT DOCUMENTS

| | | |
|---|---|---|
| CN | 105562689 A | 5/2016 |
| CN | 107336441 A | 11/2017 |
| EP | 1552905 A2 | 7/2005 |
| GB | 2550341 A | 11/2017 |
| WO | 2015082923 A1 | 6/2015 |

OTHER PUBLICATIONS

European Office Action Issued in EP Application No. 19172356.8, dated Sep. 27, 2019, 105 Pages.

*Primary Examiner* — Niki Bakhtiari
*Assistant Examiner* — John J DeRusso
(74) *Attorney, Agent, or Firm* — Cantor Colburn LLP

(57) ABSTRACT

A method of cleaning a recoater of an additive manufacturing machine includes installing a cleaning fixture into the additive manufacturing machine, the cleaning fixture including one or more cleaning elements, advancing the recoater into contact with the one or more cleaning elements, and rotating the recoater about a recoater axis thus dislodging material from a recoater outer surface due to frictional contact with the one or more cleaning elements.

6 Claims, 8 Drawing Sheets

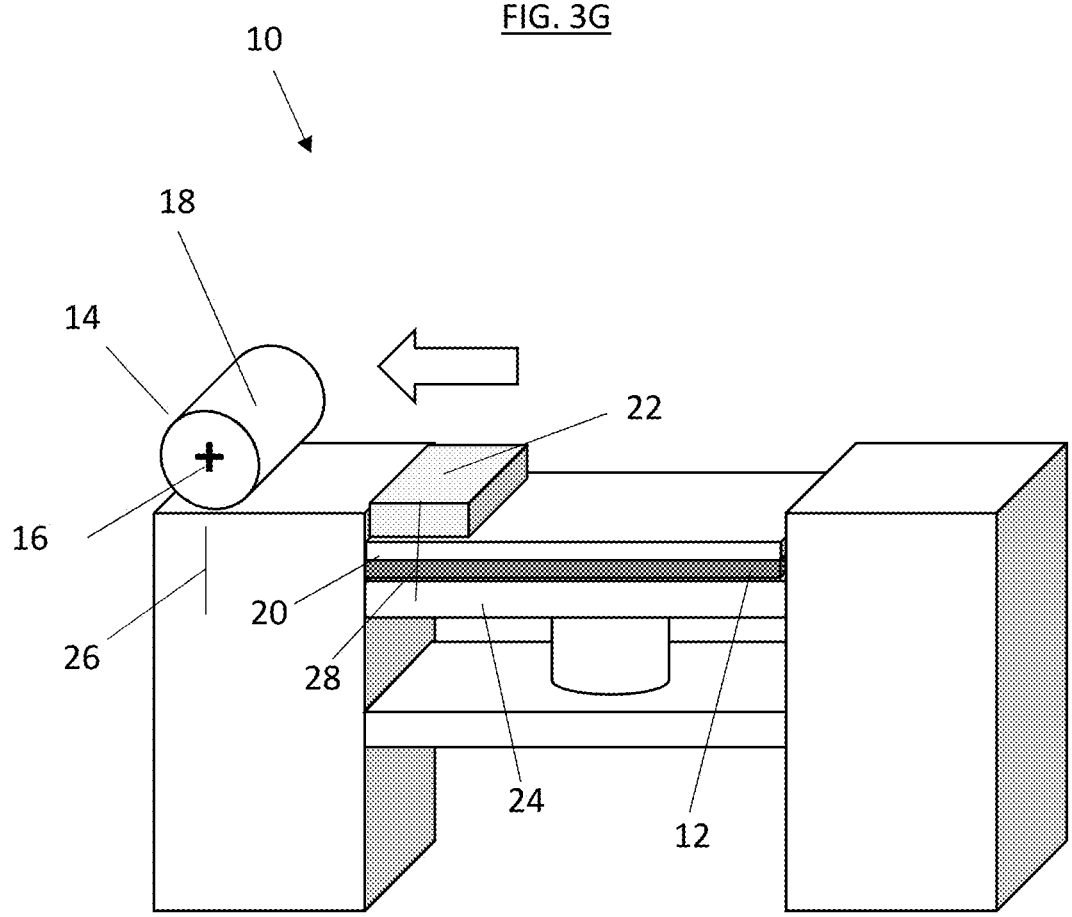

though the disclosure is not limited to such construction. Other suitable materials include, for example, ceramics. The recoater 14 periodically advances across the build plate 12 to compress deposited material powder (not shown), enabling better heat transfer in the deposited powder, and allowing for steeper unsupported angles in the component and improved uniformity in deposited layers of material powder.

FIXTURE AND METHOD OF CLEANING ADDITIVE MANUFACTURING MACHINE COMPONENTS

CROSS-REFERENCE TO RELATED APPLICATIONS

This application is a division of U.S. application Ser. No. 15/969,440 filed May 2, 2018, the disclosure of which is incorporated herein by reference in its entirety.

BACKGROUND

Exemplary embodiments pertain to the art of additive manufacturing. In particular, the present disclosure relates to cleaning of a recoater apparatus of an additive manufacturing machine.

Additive manufacturing methods and apparatuses are utilized to manufacture components of selected shapes or sizes, most often by deposition of a powder material. In one such method, referred to as laser powder bed fusion (LPBF), a recoater is utilized to compact the deposited material powder, enabling better heat transfer in the deposited powder, and allowing for steeper unsupported angles in the component and improved uniformity in deposited layers of material powder.

In other apparatuses, the recoater is a cylindrical element, more specifically described as a rolling style hard recoater that is advanced over the deposited material to compact the material as it rolls. The recoater becomes dirty and/or damaged with use, deterring its usefulness or even making the use of the recoater a liability. Debris on the recoater can cause uneven powder spreading, scratching of build plates and the potential for debris to impact the building components. These issues may be avoided by periodically cleaning the recoater, and the art would readily appreciate advances in tools in methods for cleaning the recoater.

BRIEF DESCRIPTION

In one embodiment, a method of cleaning a recoater of an additive manufacturing machine includes installing a cleaning fixture into the additive manufacturing machine, the cleaning fixture including one or more cleaning elements, advancing the recoater into contact with the one or more cleaning elements, and rotating the recoater about a recoater axis thus dislodging material from a recoater outer surface due to frictional contact with the one or more cleaning elements.

Additionally or alternatively, in this or other embodiments the cleaning fixture is installed into the additive manufacturing machine while the recoater is positioned in a home position.

Additionally or alternatively, in this or other embodiments the recoater is advanced from the home position to a cleaning position over the one or more cleaning elements prior to advancing the recoater into contact with the one or more cleaning elements.

Additionally or alternatively, in this or other embodiments the cleaning fixture is installed via a build plate of the additive manufacturing machine.

Additionally or alternatively, in this or other embodiments the cleaning fixture is secured to the build plate via one of a snap connection, one or more clamps or one or more bolts.

Additionally or alternatively, in this or other embodiments the build plate and the cleaning fixture are installed to a sintering piston of the additive manufacturing machine.

Additionally or alternatively, in this or other embodiments the one or more cleaning elements is one or more diamond sponges.

Additionally or alternatively, in this or other embodiments the cleaning fixture is installed into the additive manufacturing machine without defeating machine safety features.

In another embodiment, an additive manufacturing machine includes a build plate, a powder source configured to selectably distribute a powdered material at the build plate for manufacturing, and a recoater configured to advance over the item being manufactured and compress the distributed powder material. The recoater is configured to advance from a home position to contact with the item being manufactured and return to the home position, the recoater further configured to rotate about a recoater axis. A cleaning fixture for the recoater is installable to the build plate. The build plate includes one or more cleaning elements configured to remove material from an outer surface of the recoater as the recoater rotates about the recoater axis via frictional contact between the recoater and the one or more cleaning elements.

Additionally or alternatively, in this or other embodiments the cleaning fixture is secured to the build plate via one of a snap connection, one or more clamps or one or more bolts.

Additionally or alternatively, in this or other embodiments the one or more cleaning elements is one or more diamond sponges.

Additionally or alternatively, in this or other embodiments the cleaning fixture and the build plate are installable to a sintering piston of the additive manufacturing machine.

Additionally or alternatively, in this or other embodiments the cleaning fixture is installed into the additive manufacturing machine while the recoater is positioned in the home position.

Additionally or alternatively, in this or other embodiments the recoater is advanced from the home position to a cleaning position over the one or more cleaning elements prior to advancing the recoater into contact with the one or more cleaning elements.

Additionally or alternatively, in this or other embodiments the recoater is a cylindrical element.

BRIEF DESCRIPTION OF THE DRAWINGS

The following descriptions should not be considered limiting in any way. With reference to the accompanying drawings, like elements are numbered alike:

FIGS. 3A-3H illustrate steps in a method of cleaning a recoater of an additive manufacturing machine.

DETAILED DESCRIPTION

A detailed description of one or more embodiments of the disclosed apparatus and method are presented herein by way of exemplification and not limitation with reference to the Figures.

Figure 1:
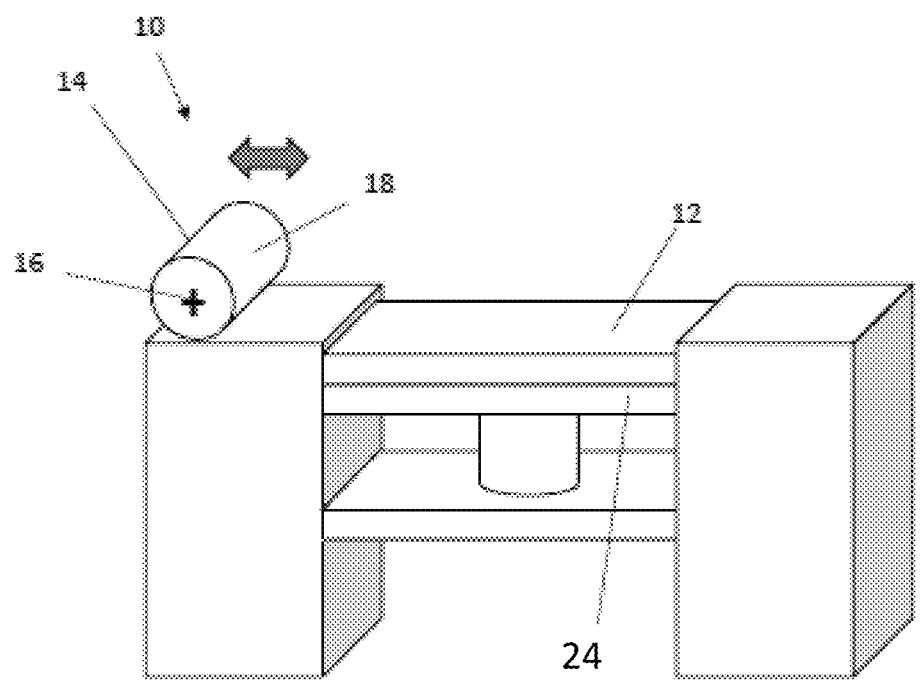
FIG. 1 is a schematic illustration of an embodiment of an additive manufacturing machine.

Referring to FIG. 1, shown is a schematic illustration of an additive manufacturing machine 10. The machine includes a build plate 12 upon which a workpiece (not shown) is formed by a laser powder bed fusion process. The machine 10 further includes a recoater 14. The recoater 14, in some embodiments, is a cylinder of, for example, tungsten carbide, that periodically advances across the build plate 12 to compress the powder material to improve formation of the workpiece. The recoater 14 may, for example, be formed entirely from tungsten carbide, or alternatively may have a recoater outer surface 18 formed from, for example, tungsten carbide, while an interior portion of the recoater 14 is formed from a different material. In advancing across the build plate 12, the recoater 14 may be rotated about a recoater axis 16. While in the embodiment of FIG. 1 the recoater 14 is configured to rotate about the recoater axis 16, it is to be appreciated that in other embodiments that the recoater 14 may be fixed at the recoater axis 16. Use of the recoater 14, however, leads to buildup of material powder and other debris on the recoater outer surface 18. Use of a recoater 14 with a debris buildup may lead to uneven application of pressure to the workpiece by the recoater 14, and thus uneven compression of the material powder by the recoater 14. Uneven compression may result in failure of the build of the workpiece.

Figure 2:
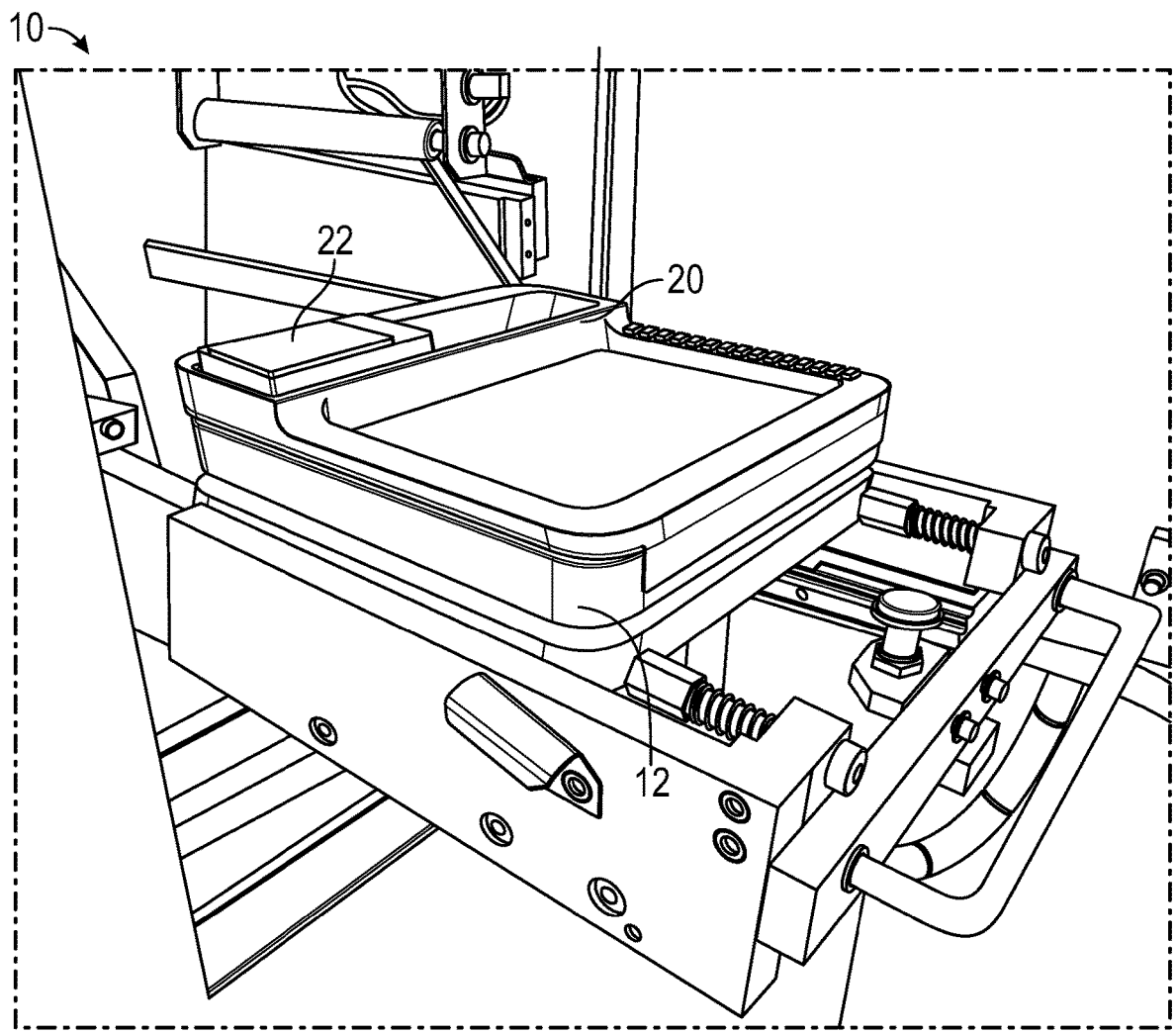
FIG. 2 is a schematic illustration of an embodiment of a cleaning fixture configured to clean a recoater of an additive manufacturing machine.

Referring now to FIG. 2, a cleaning fixture 20 is utilized to clean the recoater 14 as needed. The cleaning fixture 20 is secured to the build plate 12 by, for example, a snap fit. It is to be appreciated that in other embodiments other means may be utilized to secure the cleaning fixture 20 to the build plate 12, such as bolts, clamps, or the like. The cleaning fixture 20 includes a cleaning element 22, for example, a diamond sponge, that is configured to dislodge debris or other unwanted material from the recoater outer surface 18 when the recoater 14 is in contact with the cleaning element 22 and rotated about the recoater axis 16.

Figure 3A:
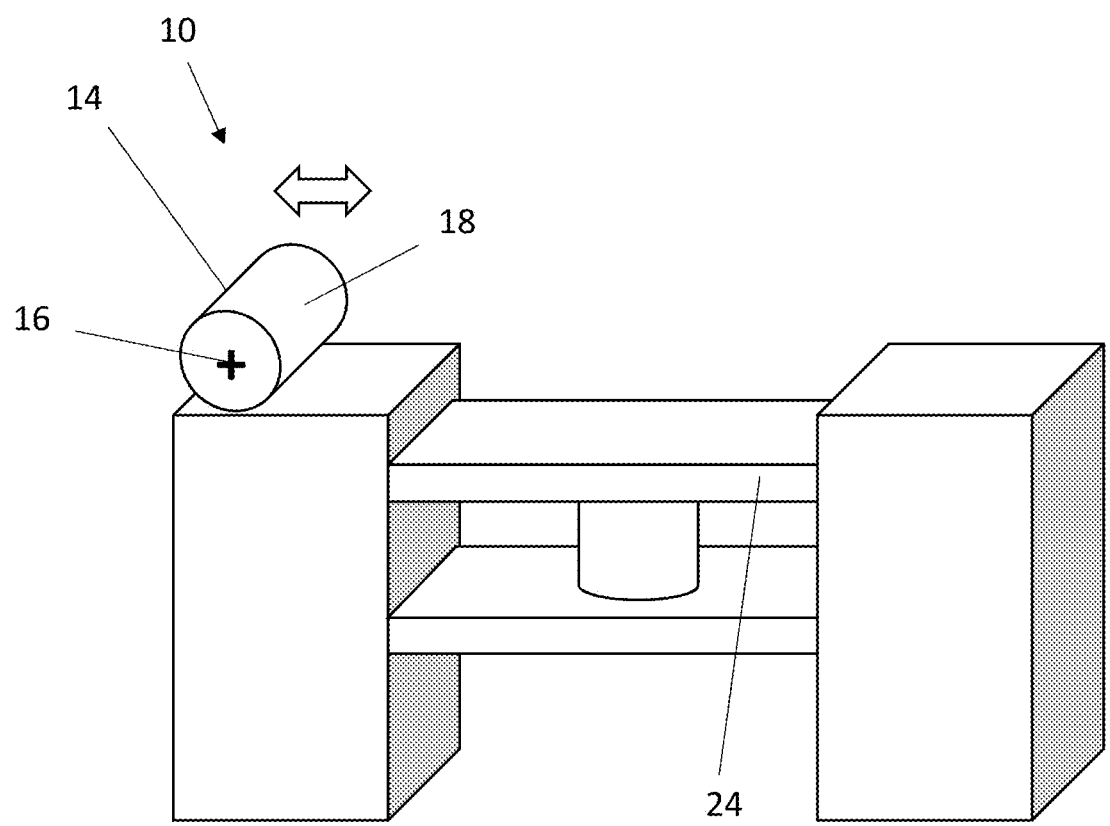
Figure 3B:
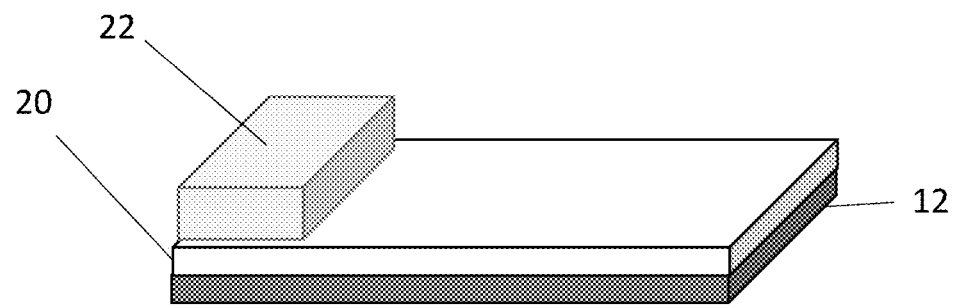

Referring now to FIGS. 3A-3H, a method of cleaning the recoater 14 utilizing the cleaning fixture 20 will now be described. In FIG. 3A, at the beginning of the method, the recoater 14 and a sinter piston 24 are positioned in their respective home positions. In FIG. 3B, the cleaning fixture 20 including the cleaning element 22 is secured to the build plate 12 via, for example, a snap connection.

Figure 3C:
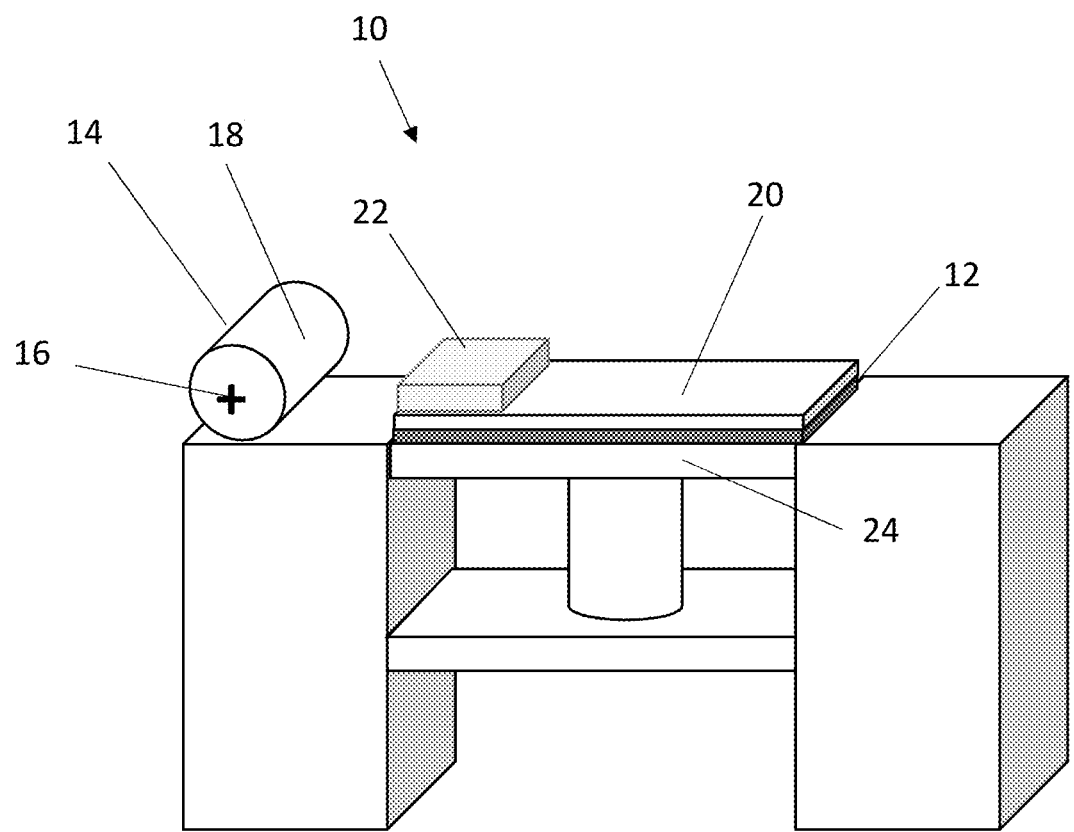
Figure 3D:
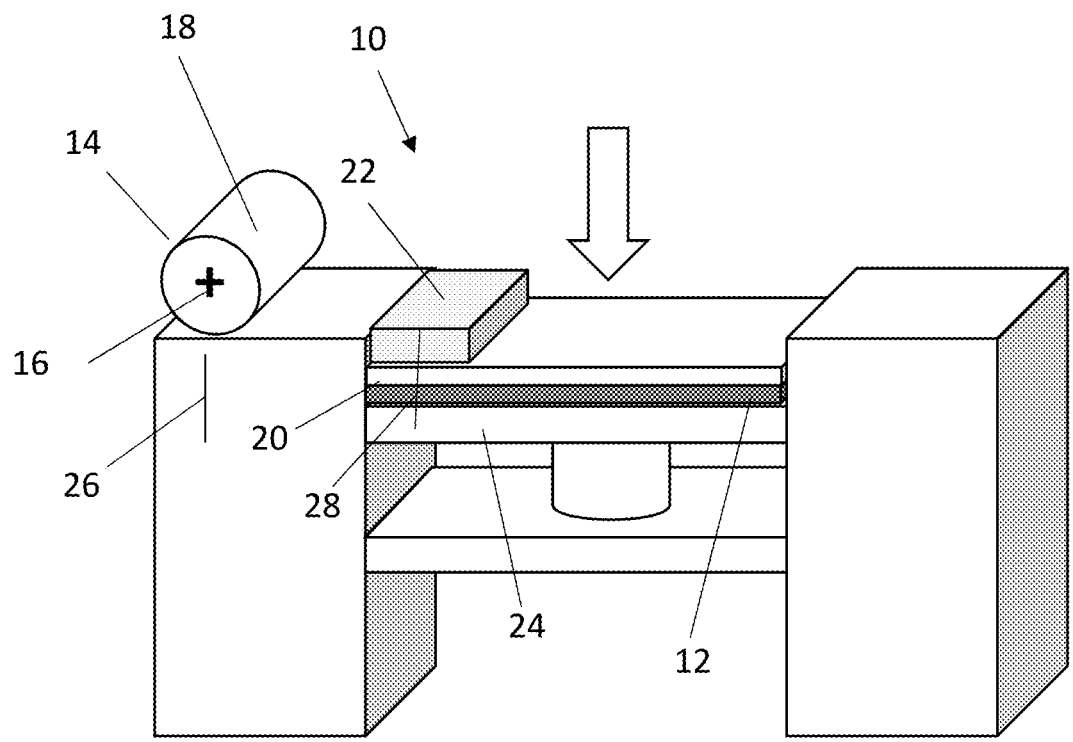

Referring now to FIG. 3C, the build plate 12 and the cleaning fixture 20 are loaded into the machine 10 and placed atop the sinter piston 24. The build plate 12 and the cleaning fixture 20 may be loaded into the machine 10 via either standard machine 10 loading procedures, or alternatively through manual methods. The loading does not require override of machine 10 safety interlocks, nor require an operator to put their hands in a live machine. In FIG. 3D, once the cleaning fixture 20 is loaded onto the sinter piston 24, the sinter piston 24 position is lowered until a sponge height of the cleaning element 22 is below the recoater outer surface 18.

Figure 3E:
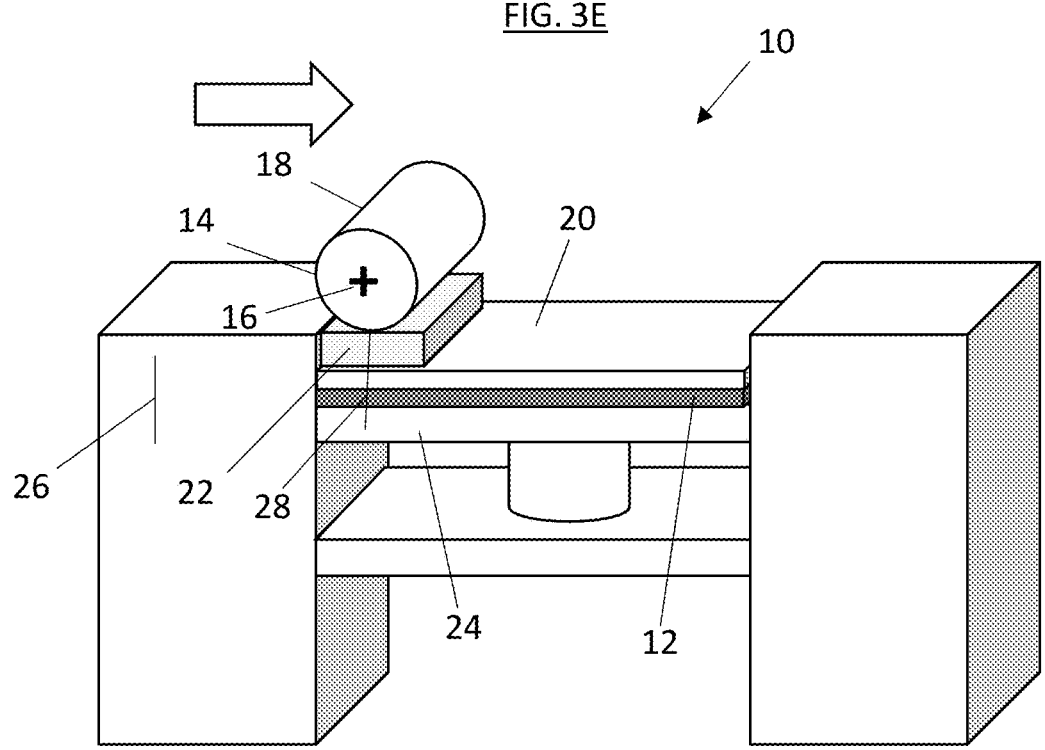
Figure 3F:
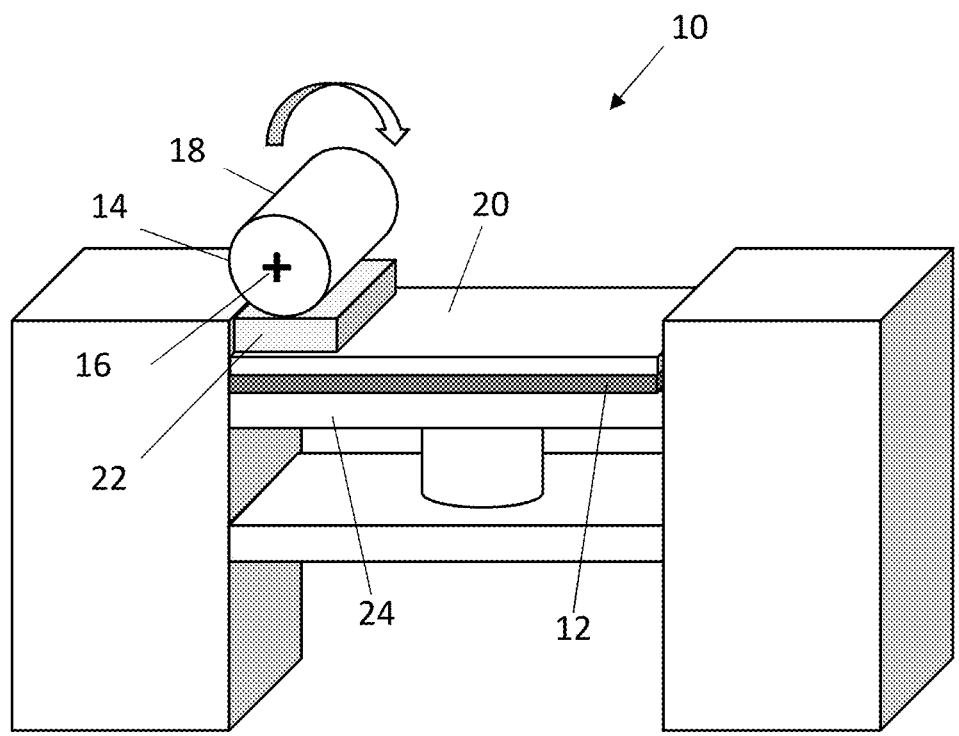

Next, as shown in FIG. 3E, the recoater 14 is advanced from its home position 26 to a cleaning position 28 over the cleaning element 22. Referring to FIG. 3F, to remove debris and other material from the recoater outer surface 18, the recoater 14 is rotated about the recoater axis 16 at the cleaning element 22 such that frictional contact between the cleaning element 22 and the recoater outer surface 18 dislodges the debris, smooths out scratches or other damage in the recoater outer surface 18, and the like. The rotation of the recoater 14 may be repeated as necessary or desired, until a desired condition of the recoater outer surface 18 is achieved.

Figure 3H:
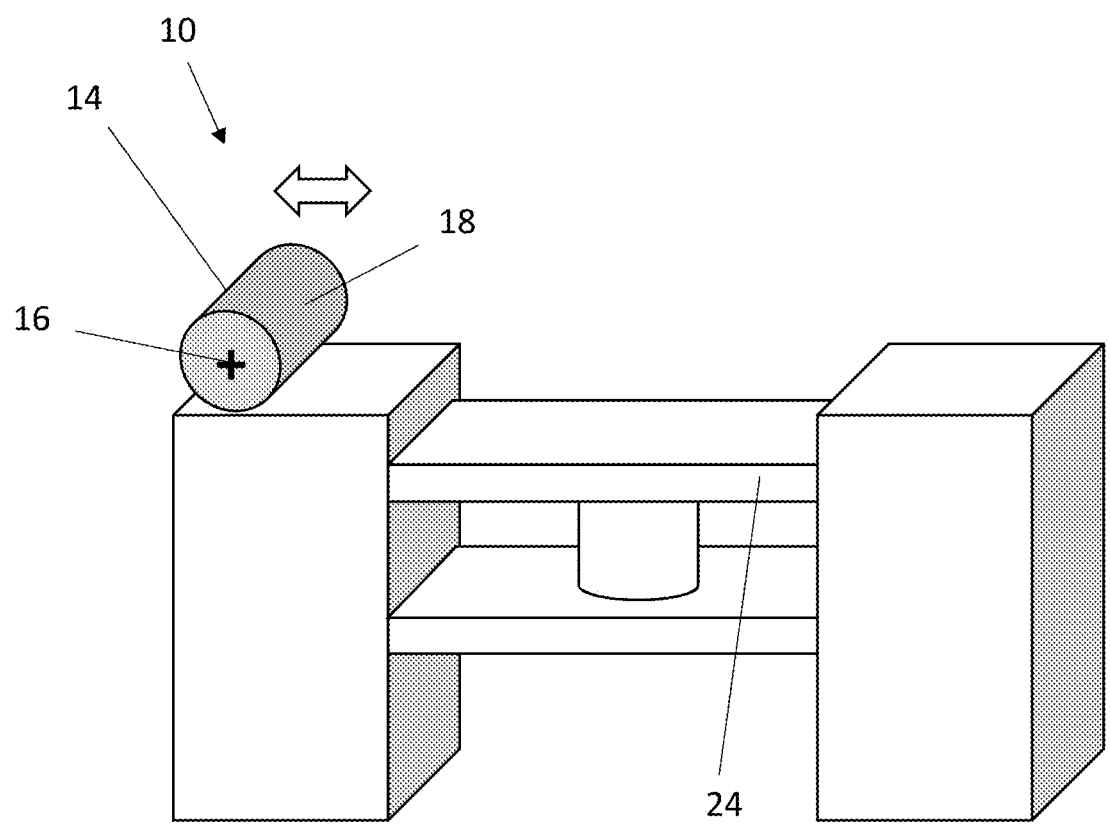

Once the selected recoater outer surface 18 condition is achieved, the recoater is returned to the home position 26 as illustrated in FIG. 3G. Finally, as shown in FIG. 3H, the cleaning fixture 20 and the build plate 12 are removed, and the machine may be returned to normal operation.

The cleaning fixture 20 and cleaning method described herein allow for repeatable, controlled cleaning of the recoater 14, thereby improving operation of the machine 10. Utilizing the cleaning fixture 20 automates the cleaning process, such that a machine operator need not defeat machine safety features and place hands in the machine 10 to achieve cleaning of the recoater 14. Further, the cleaning fixture 20 may be equipped with multiple cleaning elements 22 to reduce cleaning time of the recoater 14.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An additive manufacturing machine comprising:
    a build plate;
    a powder source configured to selectably distribute a powdered material at the build plate for manufacturing;
    a recoater configured to advance over an item being manufactured and compress the distributed powder material, wherein the recoater is configured to advance from a home position to contact with the item being manufactured and return to the home position, the recoater further configured to rotate about a recoater axis; and
    a cleaning fixture for the recoater installable to the build plate, the cleaning fixture including one or more cleaning elements configured to remove material from an outer surface of the recoater as the recoater rotates about the recoater axis via frictional contact between the recoater and the one or more cleaning elements;
    wherein the build plate and the cleaning fixture are installed to a sintering piston of the additive manufacturing machine; and
    wherein the cleaning fixture is moved via movement of the sintering piston.

2. The additive manufacturing machine of claim 1, wherein the cleaning fixture is secured to the build plate via one of a snap connection, one or more clamps or one or more bolts.

3. The additive manufacturing machine of claim 1, wherein the one or more cleaning elements is one or more diamond sponges.

4. The additive manufacturing machine of claim 1, further comprising installing the cleaning fixture into the additive manufacturing machine while the recoater is positioned in the home position.

5. The additive manufacturing machine of claim 4, further comprising advancing the recoater from the home position to a cleaning position over the one or more cleaning elements prior to advancing the recoater into contact with the one or more cleaning elements.

6. The additive manufacturing machine of claim 1, wherein the recoater is a cylindrical element.

\* \* \* \* \*